(12) United States Patent
Ahmad et al.

(10) Patent No.: US 7,178,150 B1
(45) Date of Patent: Feb. 13, 2007

(54) SERIALIZATION METHOD FOR TRANSMITTING DATA VIA CORBA INTERCEPTORS

(75) Inventors: Andrew Ahmad, Dallas, TX (US); Jason Xue, Flower Mound, TX (US)

(73) Assignee: Sprint Communications Company L.P., Overland Park, KS (US)

( * ) Notice: Subject to any disclaimer, the term of this patent is extended or adjusted under 35 U.S.C. 154(b) by 709 days.

(21) Appl. No.: 10/354,628

(22) Filed: Jan. 29, 2003

(51) Int. Cl.
*G06F 3/00* (2006.01)
*G06F 9/44* (2006.01)
*G06F 9/46* (2006.01)
*G06F 13/00* (2006.01)

(52) U.S. Cl. ......................... 719/313; 707/1
(58) Field of Classification Search ........ 719/313–316; 717/1, 200
See application file for complete search history.

(56) References Cited

U.S. PATENT DOCUMENTS

| | | | |
|---|---|---|---|
| 6,412,010 B1 * | 6/2002 | Kind .......................... 709/230 |
| 6,944,643 B1 | 9/2005 | Ahmad et al. |
| 6,973,657 B1 | 12/2005 | Ahmad et al. |
| 2002/0124118 A1 * | 9/2002 | Colley et al. ................ 709/315 |
| 2004/0039964 A1 * | 2/2004 | Russell et al. ................ 714/25 |
| 2004/0268242 A1 * | 12/2004 | Layman et al. ............. 715/513 |
| 2005/0071316 A1 * | 3/2005 | Caron ........................... 707/1 |

* cited by examiner

*Primary Examiner*—William Thomson
*Assistant Examiner*—Diem Cao

(57) ABSTRACT

A serialized sequence of data for transmitting a set of data objects. The sequence comprises a plurality of value holders and a key indicating the number of value holders in the sequence. Each value holder comprises the name of the data type and a data object. The data types include fixed length and variable length data types. The value holders containing fixed length data types have no ending tag. The variable length data types comprise strings and forms. The value holders containing strings end with a special character or a special set of characters. The value holders containing a form data type incorporate a plurality of nested value holders contained within the form value holder. The form value holder comprises a form key indicating the number of value holders contained within the form value holder and a plurality of value holders nested within the form value holder.

13 Claims, 2 Drawing Sheets

SERIALIZATION METHOD FOR TRANSMITTING DATA VIA CORBA INTERCEPTORS

CROSS-REFERENCE TO RELATED APPLICATIONS

Not applicable.

STATEMENT REGARDING FEDERALLY SPONSORED RESEARCH OR DEVELOPMENT

Not applicable.

REFERENCE TO A MICROFICHE APPENDIX

Not applicable.

FIELD OF THE INVENTION

The invention is in the field of transaction management in distributed object computing systems. More specifically, a method is provided for serializing transaction data for transmission via CORBA interceptors.

BACKGROUND OF THE INVENTION

In order for diverse applications to communicate with one another and share data, standards (uniform conventions for data storage and communication) had to be established. Standards allow businesses to use applications in a heterogeneous operating environment, which run on top of infrastructure from multiple vendors. Standards also promote portability, making it possible for an organization to migrate from one system to another. Indirectly, standards also make it easier and cheaper to implement a complex system, because they impose a proven framework for solving problems by breaking them into discrete parts.

In 1989, a diverse group of vendors and users who believed in the benefits of object-oriented development formed an industry coalition. This group's goal was the development of a consensual standard for work with objects. This coalition, the Object Management Group (OMG), is now the world's largest software consortium, with more than 800 corporate members. CORBA, the Common Object Request Broker Architecture, is the OMG's distributed, object-oriented application standard [CORBRA2.3.1] which is incorporated herein by reference. The architecture described how object-oriented programs should communicate with one another in a distributed computing environment.

At the heart of the CORBA specification is the Object Request Broker (ORB). The ORB is the software entity that manages the interactions between objects (called CORBA objects) on the network. For example, if an application wishes to invoke a function on a CORBA object on another computer, it is the ORB that locates the object and guarantees that the function will be correctly invoked on the target object. An ORB might be implemented as a software library, as operating system kernel routines, as an executable program, or as some combination of the three. From the users' point of view, it is irrelevant how the ORB is implemented; all that matters is the functionality that the ORB provides.

The CORBA specification mandates the location transparency of objects. This means that the developer need only be concerned with which objects to contact and how to invoke function calls, not where those objects are physically located on the network. When a client wishes to communicate with the CORBA server, it sends that request to the ORB, which locates (or creates) the requested object and initiates communication between the two. The ORB frees the client application from having to know whether the objects it requires reside on the same computer or are located on remote computers somewhere on the network. The client application only needs to know the objects' names and understand the details of how to use each object through a call to its interface. The ORB takes care of the details of locating the object, routing the request, and returning the result. The location transparency property of the CORBA specification greatly facilitates the development of distributed applications.

The programming language in which objects are implemented is not important. It makes no difference if a front-end client program is written in Java or Smalltalk, while the server application is written in C or C++. The CORBA architecture guarantees that any CORBA client can communicate with any CORBA server. This flexibility is achieved by converting the programming language-dependent data types to language-independent CORBA data types. The CORBA data types are then transferred through the underlying communication medium. The process of converting language-dependent data types to CORBA data types is called 'marshalling'. The reverse process, converting CORBA data types to language-dependent data types, is called 'demarshalling'. Marshalling/demarshalling is performed on the arguments of CORBA method invocations.

The Object Management Group's Interface Definition Language (IDL) is a language that defines interfaces for object-based systems. The language-independent IDL files define the operations that an object is prepared to perform, the input and output parameters it requires, and any exceptions that may be generated along the way. IDL files can be thought of as a contract that a CORBA server writes for potential clients of the object. Such clients must use the same interface definition to build and dispatch invocations that the CORBA server uses to receive and respond. The client and the server are then connected via at least three pieces of software: an IDL stub on the client, one or more ORBs, and a corresponding IDL skeleton in the object's implementation. IDL is responsible for CORBA's language flexibility. It is kind of "middle-ware" that allows a program written in C++ to use objects written in Smalltalk, for example, and vice-versa. IDL can even be used to create object-based servers in languages like C that are not object-oriented. Indeed, with IDL, an entire program running on one computer can be viewed as a single object by a client running on another. A word processor, a spreadsheet or a CAD system can have an interface written in IDL to offer object-based services to clients running on other machines. Thus, IDL and CORBA are ideally suited for object-based interfaces to transaction processing systems.

The Object Transaction Service (OTS) is the Object Management Group's formal specification [OTS97], which is incorporated herein by reference, describing how programs should communicate with transaction processing servers in an object-oriented way. It defines a list of services that can be provided to aid in online transaction processing by defining how atomic transactions can be distributed over multiple objects and multiple ORBs. It is part of the CORBA services.

The word transaction has a very broad scope but generally can refer to an automated operation in which multiple steps must occur successfully in order for the entire operation to be considered successful. If a failure occurs at any step in the operation then any parameters that were modified by previous steps are typically rolled back to the status they held before the entire operation began. If all steps are completed successfully then the transaction can be said to be committed and no rollbacks are permitted. Within CORBA, the OTS specification includes interfaces that implement functions such as rollback and commit that are necessary to implement distributed transaction processing. An ORB-based transaction can include multiple local database transactions controlled through OTS. It can include a single database transaction on a local or remote server. If the transaction is entirely local to the client that initiates it, then the ORB can be bypassed and the transaction can be controlled locally. Further, the OTS offers the capability of supporting recoverable nested transactions, in either a homogeneous or heterogeneous environment, that fully support Atomicity, Consistency, Isolation, and Durability (ACID), and two-phase commit protocols.

CORBA provides a mechanism that allows an application programmer to execute some custom code on either the client or server side prior to the execution of the implemented CORBA method code. This concept is called intercepting a method invocation and the custom code that gets executed is known as an interceptor. Interceptors are an optional extension to the ORB. An interceptor is interposed in either the invocation and/or response paths between a client and a targeted object and is responsible for the execution of one or more ORB services. Typically, the ORB will invoke an interceptor upon receiving a particular request for services from a targeted object. The interceptor will then perform one or more actions, including invoking other objects. In this manner, interceptors provide a way to add portable ORB services to a CORBA compliant object system.

When a client calls a method to begin a transaction, a transaction context is created and passed to the server by means of an interceptor. The transaction context describes such things as which clients, servers, and databases are involved in the transaction and which operations are to be performed. The transaction context also typically has a transaction identification number that can be referred to as the XID. As the transaction context is passed among various clients and serves in the course of a transaction, the OTS uses the XID to keep track of the status of the transaction.

There are traditionally two ways to indicate that an operation is a transaction. One is to inherit all methods from an interface provided by the OTS called Transactional Object. The OTS knows that any method inherited from Transactional Object is a transaction. The drawback of this technique is that all methods inherited from Transactional Object will be treated as transactions regardless of whether a user actually wants them to be considered transactions. The other way of designating an operation as a transaction is to add an extra parameter to the transactional methods. This allows a user to choose which methods are transactional but has the drawback that a change in any method requires a change in the interface. Every client using the interface must then be recompiled.

A system called Encore has been developed to overcome these drawbacks by eliminating the need for extra parameters or for inheritance from another interface. With Encore, a file called a deployment descriptor is used to designate which methods are and are not transactional. All method calls are intercepted and looked up in the deployment descriptor. If the deployment descriptor indicates that a method is transactional then the appropriate transaction context information is passed with the method in an interceptor. The deployment descriptor can be changed at any time without the need for recompiling an application.

SUMMARY OF THE INVENTION

An embodiment of the invention is a serialized sequence of data for transmitting a set of data objects. The sequence can comprise a plurality of value holders and a key indicating the number of value holders in the sequence. Each value holder can comprise a name providing the data type contained in the value holder and a value providing a representation of the data object contained in the value holder. The data types can comprise fixed length data types that have no ending tag. The fixed length data types can comprise arrays, blobs, booleans, chars, integers, and floating points. The integers can comprise 16 bit integers, 32 bit integers, and 64 bit integers. The data types can further comprise variable length data types. The variable length data types can comprise strings. The value holders containing a string data type can comprise a name identifying the data type contained in the value holder as a string and a value providing a representation of the data object contained in the value holder. The value can end with a special character or a special set of characters. The variable length data types can further comprise forms. The value holders containing a form data type can incorporate a plurality of nested value holders contained within the form value holder. The form value holder can comprise a form key indicating the number of value holders contained within the form value holder and a plurality of value holders nested within the form value holder. The nested value holders can each comprise a name providing the data type contained in the nested value holder and a value providing a representation of the data object contained in the nested value holder. A value holder containing a form data type has no ending tag. The serialized sequence of data can consist essentially of an octet sequence capable of being transmitted by a CORBA interceptor. The set of data objects transmitted can make up a transaction context. The names providing the data types can consist essentially of type codes.

An alternative embodiment is a method for communicating a transaction context made up of a set of data objects using an interceptor. The method can comprise identifying a transaction context to be communicated, encoding the context into an octet sequence, using an interceptor to convey the octet sequence to the desired destination, and decoding the octet sequence to extract the data objects making up the transaction context. The octet sequence can comprise a plurality of value holders and a key indicating the number of value holders in the sequence. The value holders can each comprise a name providing the data type contained in the value holder and a value providing a representation of the data object contained in the value holder. The interceptor can be a CORBA interceptor. In the octet sequence, the data types can comprise fixed length data types. A value holder containing a fixed length data type has no ending tag. In the octet sequence, the data types can further comprise variable length data types. The variable length data types can comprise strings. The value holders containing a string data type can comprise a name identifying the data type contained in the value holder as a string, a value providing a representation of the data object contained in the value holder, and a special character ending the value. The variable length data types can further comprise forms. The value holders containing a form data type can incorporate a plurality of nested value holders contained within the form value holder. The form value holder can comprise a form key indicating the number of value holders contained within the form value holder and a plurality of value holders nested within the form value holder. The nested value holders can each comprise a name providing the data type contained in the nested value holder and a value providing a representation of the data object contained in the nested value holder. A value holder containing a form data type has no ending tag.

DETAILED DESCRIPTION OF THE INVENTION

Figure 1:
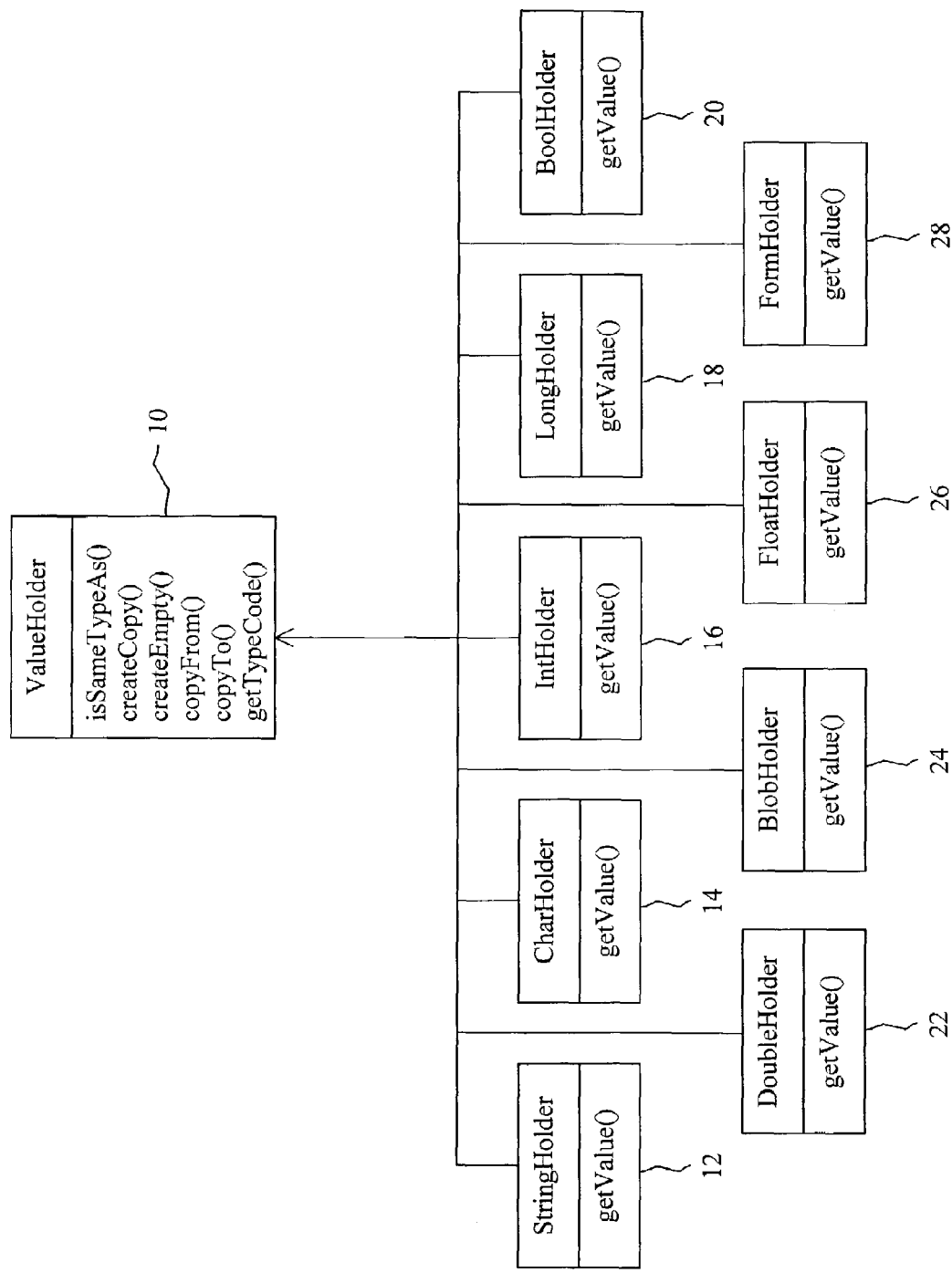
FIG. 1 is a block diagram depicting the data structure of an object class that can be used by an embodiment of the invention.

Traditional CORBA interceptors are limited to transferring only one type of data, an octet sequence. An octet sequence is a series of eight-bit bytes of data. These octet sequences, in themselves, are typically not adequate for transferring complex data such as that typically found in a transaction context. In order for a CORBA interceptor to transfer complex data, the sender must encode the data in some pre-agreed format and the receiver must be able to parse the format and extract information from it. This process of encoding and decoding information is known as serialization.

One serialization technique is the use of XML to mark up a string of text. An XML parser on the client side can serialize the data and another XML parser on the server side can deserialize the data. This serialization technique can become verbose since XML requires the each piece of data be identified with a starting tag and an ending tag. When the parser finds a starting tag it must skip ahead to find the corresponding ending tag. It then knows that everything in between represents one particular data type. The data string created in this manner can become long and the time needed to process it can become excessive. In addition, with an XML serialization technique, every method passed between a client and a server typically must be parsed, regardless of whether it is transactional or not. This can further increase the processing time needed for a transaction.

The Java programming language can also be used for the serialization of data. However, Java can only be used with other Java-based programs and cannot be used with multiple languages as can a CORBA-based environment.

The present invention provides a method for serializing data in a CORBA octet sequence. A set of data objects defined in a specific programming language, such as Java or C++, is converted into a series of names and values. The name is typically a type code that describes the data type contained in the value. The value is a text representation of a data object.

In an embodiment of the invention, the data types may include fixed length data types such as Array, Blob, Boolean, Char, Int16, Int32, Int64, Double64, and Float32. An Array can be considered an associative container. It is a collection of objects each of which is associated with a key, where the key is typically an integer. A Blob is an arbitrary collection of bytes that can be used to represent any type of data such as a representation of a graphic image, a binary file, or an object. A Boolean is a true or false value. A Char is a single character that could be an alphanumeric character or a non-printing character. An In16 is a 16-bit integer (non-fractional real number) whose value range is −32,767 to 32,768. An Int32 is a 32-bit integer whose value range is −2147483647 to 2147483648. An Int64 is a 64-bit integer whose value range is −9223372036854775807 to 9223372036854775808. A Double64 is a 64-bit floating-point value that can consist of an integer component plus a fractional component. A Float32 is a 32-bit floating-point value that can consist of an integer component plus a fractional component. For purposes of this specification, the Int16, Int32, Int64, and similar data types can be referred to generically as integers. Similarly, the Double64, Float32, and similar data types can be referred to generically as floating points. While specific names and nicknames are used for the data types herein, one of skill in the art will recognize that alternate names may be used for similar types of data which would have equal applicability in light of the disclosure. When the names in question are employed, the intent is to address data types of similar definitional content as understood by those of skill in the art, rather than strictly data types called (for example) "int32" or "integer."

In an embodiment of the invention, the data types may also include variable length data types such as Form (described below) and String. A String is a sequence of characters that is typically some kind of human-readable text but may also contain a stringified (converted to a string) representation of an object.

The type code is typically a string of text of approximately two to four characters that specifies one of the data types. For example, a String data type might have a type code of 'str'. An int type of 32 in Java might be encoded into an Int32 type code and have a value of the string "32". Decoding is done in the reverse manner.

An entity known as a value holder typically contains the type code and the data value. Each of the different data types has its own type of value holder. Each type of value holder recognizes the object data structure and thus knows the type of data it contains and how to serialize the object. This allows the value holder to write the data object into itself on the client side and read the data object out of itself on the server side. The separation of the serialization algorithm from the object allows the object to be serialized in different formats as determined by the value holder object.

When a transactional operation occurs between a client and a server, a transaction context is created and converted to a series of value holders. These value holders, in the form of a series of name/value pairs, can be encoded as a text string and placed in a CORBA octet sequence to carry the transactional information. A typical format is as follows:

[#pairs][type code][value][type code][value][type code][value]. . .

The first data element in this sequence, also referred to as the key for the sequence, indicates the number of type code/value pairs that are to follow. All of the data types except String and Form have a fixed length. Thus, when data is read out of an octet sequence, it is clear where one value holder ends and the next begins. This eliminates the need for the starting and ending tags used in XML and makes the octet sequence more concise than if XML were used to transmit transactional information. This reduces the time needed to process an octet sequence compared to the use of XML for serialization. Processing time is further reduced compared to XML through the elimination of the need to skip ahead to find an ending tag.

Since strings can typically be of any length, it is not possible to specify a fixed length for the String data type.

Instead, the end of a string is typically marked by a special character or set of character '/0'. for example.

The Form data type is a nested, recursive type that can contain a series of name/value pairs where the value can be any of the above data types, including another Form. More specifically, a Form is preferably a polymorphic map in C++ or a hash table in Java that keeps an association between two value holders. One value holder acts as a key and the other as a value. The key identifies what the data represents. For example, if multiple strings are present in a sequence, the key would distinguish each string from the others. Also, since the key designates the data type of each name/value pair and each data type has a fixed length, the key indirectly specifies the length of each name/value pair within a Form. In a format similar to that of the value holders, the number of name/value pairs within a Form is specified by a data element at the beginning of the series of name/value pairs that indicates the number of name/value pairs that are to follow. The data element providing the number of name/value pairs within a form is also referred to as a form key. In one embodiment, this key may provide information in addition to the number of name/value pairs.

Different instances of the association between two value holders can be sorted for quick retrieval. Applications should not rely on this order, however, since the implementation details may be changed in the future. The dynamic, polymorphic and self-explanatory characteristics of the Form data type can simplify application programming. Form can be used as a map, array, list, table, or data schema. Data marshalling and demarshalling with type safety is also possible. In one variant, a Form is aggregated internally to provide array functions. In this variant, the key is always an integer and the element can be any value holder. As Form is a language neutral implementation, the use of Form can enhance portability.

A single value holder object class, which can be referred to as ValueHolder, can be created as a common base class for polymorphic handling of the different value holder types. Each individual holder class subordinate to Value Holder contains a method to retrieve a data value in the correct type without casting. ValueHolder guarantees that the value transfer between holders is always performed under the right type. If the type is not matched, the value transfer does not happen.

An embodiment of the ValueHolder class and its subordinate classes is shown in FIG. 1. The ValueHolder base class 10 contains the methods isSameTypeAs(), createCopy (), createEmpty(), copyFrom(), copyTo(), and getTypeCode (). As one familiar with the art will recognize, the particular names of the methods are not critical as long as the methods perform the appropriate functions such as copying data from or to a value holder. In this embodiment, nine classes are subordinate to ValueHolder 10. They are StringHolder 12, CharHolder 14, IntHolder 16, LongHolder 18, BoolHolder 20, DoubleHolder 22, BlobHolder 24, FloatHolder 26, and FormHolder 28. Each of these subordinate classes is a value holder for the data type indicated in its title. For example, StringHolder 12 holds strings, CharHolder 14 holds alphabetic characters, etc. Each of these value holders contains a method, called getValue() in this embodiment, that can retrieve a data value of the type indicated in its title.

ValueHolder guarantees the object is handled in the correct type while keeping the original object simple. For example, when an application wants to handle the object polymorphically, it can use ValueHolder as the object variable. When the application tries to retrieve the object from this variable, the application uses another value holder of the correct type to ask the variable to transfer the value to the provided holder. Since the application is using the holder of the correct type to retrieve the value back, getValue() (which is a non-polymorphic method) returns the correct type of object. This eliminates the need for type casting as the type manipulation is done within the value holder. There is no application accessible code to access the type information. Therefore, the application cannot cause a system error by casting into the wrong type. Another advantage is implementation language independence: the same technique can be implemented in another programming language while maintaining the semantics of the container.

An archive can be used to manage the octet sequences. This archive is a generic storage provider for a value holder when it tries to serialize the held object. The value holder interacts with the archive to transfer the value of an object in a series of bytes. The format of the object is irrelevant to the archive because it is the job of the value holder to retrieve the object. The primary function of the archive is to provide a contiguous memory space for the serialization. After the serialization of a series of holders, the archive has one piece of contiguous memory space containing the image of all serialized objects. A stream of bytes can be transferred to another process or stored locally in the system. This archive provides a very comprehensive and handy facility for storing an object in one contiguous memory, which is helpful when an object needs to be stored to a file or sent over a network. Every value holder is able to interact with this archive in order to write data into itself in the proper format on the client side. On the server side, the archive is able to recognize the different data types by looking at the type code in the value holder. When the archive sees a particular data type, it allows the value holder to read the data out of itself in an appropriate manner.

There can be two types of archives, non-typed and typed. In the majority of cases, objects do not need to be serialized with type information, as the type of object expected during the deserialization is already known. In cases dealing with objects polymorphically, the receiving side of the archive does not know the exact type of the object, requiring the type information to be included in the serialized stream. Since a dynamic data structure is constructed at runtime in this case, the type information must be included with the object when the structure is serialized.

Figure 2:
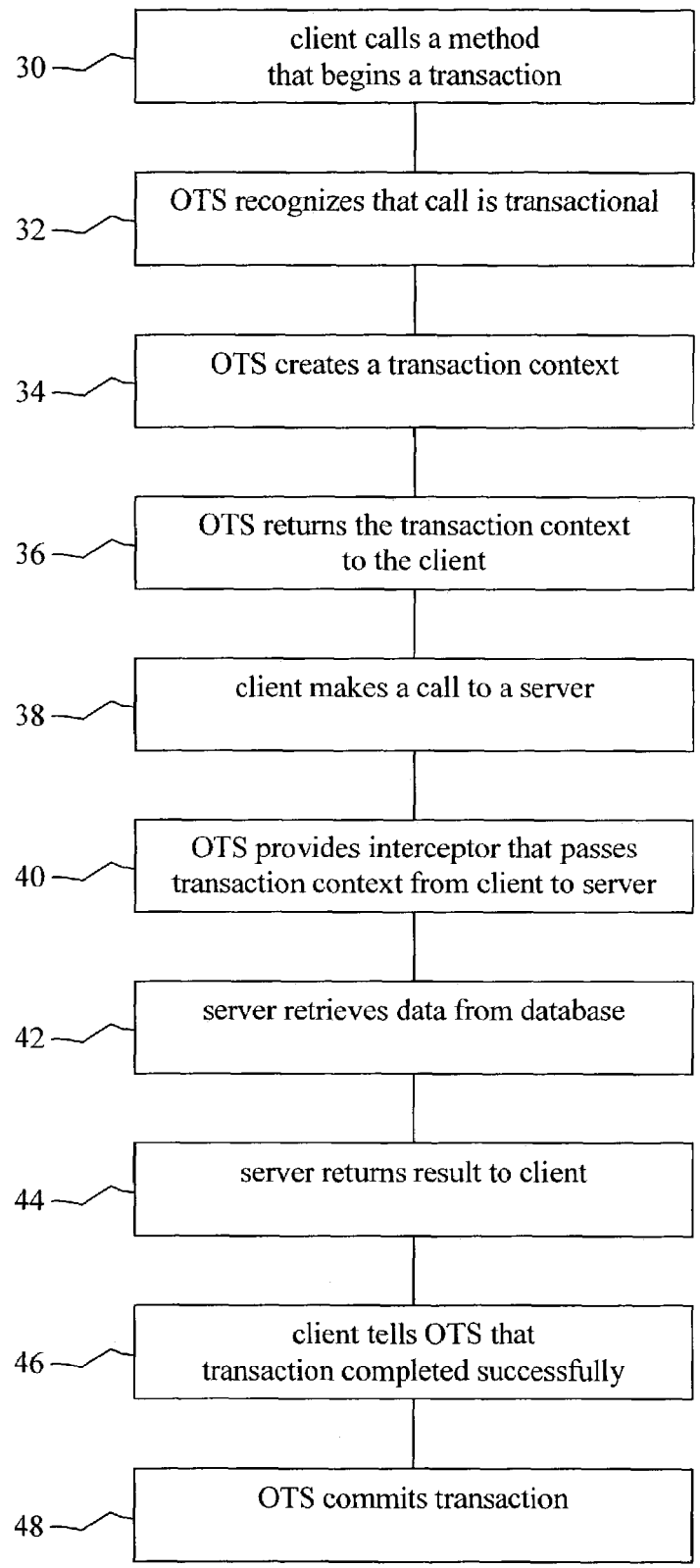
FIG. 2 is a block diagram of steps that can be taken by a typical transaction.

FIG. 2 shows typical steps that can occur in the course of a transaction, in this case the retrieval of data from a database. In box 30 a client calls a method that beings the transaction. In box 32 the Object Transaction Service (OTS) recognizes that the method call is a transactional method. OTS then creates a transaction context in box 34. In box 36 OTS returns the transaction context to the client. The client then makes a call to the server in box 38. OTS recognizes that the server interface inherits from the Transactional Object and so, in box 40, it provides an interceptor that passes the transaction context from the client to the server. It is at this point in the transaction that serialization as described herein can occur so that the transaction context can be efficiently passed from the client to the server. In box 42 the server retrieves the data from the database and then returns the data to the client in box 44. In box 44 the client informs OTS that the transaction has completed successfully. Finally, in box 48, OTS commits the transaction.

Although only a few embodiments of the present invention have been described, it should be understood that the present invention may be embodied in many other specific forms without departing from the spirit or the scope of the present invention. The present examples are to be considered as illustrative and not restrictive, and the invention is not to be limited to the details given herein, but may be modified within the scope of the appended claims along with their full scope of equivalents.

What is claimed is:

1. A computer implemented method comprising:
communicating a set of data objects as a serialized sequence of data, the sequence comprising:
a key indicating a number of value holders in the sequences;
a plurality of value holders, the value holders each comprising:
a name providing the data type contained in the value holder;
a value providing a representation of the data object contained in the value holder;
wherein the data types comprise fixed length data types or variable length data types; and
the variable length data types comprises strings or forms;
when the data type is a fixed length data type, the corresponding value holder has no ending tag;
when the data type is a variable length data type and is a string, the corresponding value holder has a special character ending tag; and
when the data type is a variable length data type and is a form, the corresponding value holder has a form key that indicates a number of value holders within the form and a plurality of nested value holders; wherein each value holder containing a form data type has no ending tag; and
using an interceptor to convey the sequence to the desired destination.

2. The method of claim 1, wherein the fixed length data types comprise arrays, blobs, booleans, chars, integers, and floating points.

3. The method of claim 2, wherein integers comprise 16 bit integers, 32 bit integers, and 64 bit integers.

4. The method of claim 1, wherein the value holders containing the string data type comprise:
a name identifying the data type contained in the value holder as a string;
a value providing a representation of the data object contained in the value holder;
the value ending with the special character.

5. The method of claim 4, wherein the special character comprises a special set of characters.

6. The method of claim 1, wherein:
the plurality of value holders nested within the form value holder each comprise:
a name providing the data type contained in the nested value holder;
a value providing a representation of the data object contained in the nested value holder.

7. The method of claim 1, wherein the sequence consists essentially of an octet sequence capable of being transmitted by a CORBA interceptor.

8. The method of claim 1, wherein the set of data objects transmitted make up a transaction context.

9. The method of claim 1, wherein the names consist essentially of type codes.

10. A computer implemented method for communicating a transaction context made up of a set of data objects using an interceptor comprising:
identifying a transaction context to be communicated;
encoding the context into an octet sequence wherein the octet sequence comprises:
a key indicating the number of value holders in the sequence;
a plurality of value holders, the value holders each comprising:
a name providing the data type contained in the value holder;
a value providing a representation of the data object contained in the value holder;
using the interceptor to convey the octet sequence to the desired destination;
decoding the octet sequence to extract the data objects making up the transaction context;
wherein the data types comprise fixed length data types or variable length data types; and
the variable length data types comprise strings or forms;
when the data type is a fixed length data type the corresponding value holder had no ending tag;
when the data type is a variable length data type and is a string, the corresponding value holder has a special character ending tag; and
when the data type is a variable length data type and is a form, the corresponding value holder has a form key that indicates a number of value holders within the form and a plurality of nested value holders; wherein each value holder containing a form data type has no ending tag.

11. The method of claim 10 wherein the interceptor is a CORBA interceptor.

12. The method of claim 10, wherein the value holders containing a string data type comprise:
a name identifying the data type contained in the value holder as a string;
a value providing a representation of the data object contained in the value holder;
the value ending with the special character.

13. The method of claim 10, wherein:
the plurality of value holders nested within the form value holder, each comprise:
a name providing the data type contained in the nested value holder;
a value providing a representation of the data object contained in the nested value holder.

* * * * *